United States Patent
Phillips et al.

(10) Patent No.: US 7,832,319 B2
(45) Date of Patent: Nov. 16, 2010

(54) BLADE CLAMP ASSEMBLY

(75) Inventors: Alan Phillips, Jackson, TN (US); John W. Schnell, Jackson, TN (US)

(73) Assignee: Black & Decker Inc., Newark, DE (US)

( * ) Notice: Subject to any disclaimer, the term of this patent is extended or adjusted under 35 U.S.C. 154(b) by 35 days.

(21) Appl. No.: 12/009,804

(22) Filed: Jan. 22, 2008

(65) Prior Publication Data
US 2008/0115645 A1    May 22, 2008

Related U.S. Application Data

(60) Division of application No. 10/687,542, filed on Oct. 16, 2003, now Pat. No. 7,343,841, which is a continuation-in-part of application No. 10/368,286, filed on Feb. 18, 2003, now abandoned.

(60) Provisional application No. 60/357,377, filed on Feb. 15, 2002, provisional application No. 60/357,549, filed on Feb. 15, 2002, provisional application No. 60/418,967, filed on Oct. 16, 2002.

(51) Int. Cl.
F16B 33/00 (2006.01)
F16B 37/00 (2006.01)

(52) U.S. Cl. .................. 83/481; 83/666; 83/698.41; 83/954; 83/471.3; 403/259; 411/432; 451/342

(58) Field of Classification Search .............. 83/481, 83/666, 698.11, 698.41, 954; 30/329, 339, 30/388; 403/259; 411/408, 432, 919; 451/342
See application file for complete search history.

(56) References Cited

U.S. PATENT DOCUMENTS

| | | | |
|---|---|---|---|
| 1,300,161 A * | 4/1919 | Grain | ............... 451/342 |
| 2,503,189 A | 4/1950 | Biba, Jr. | |
| 2,704,426 A | 3/1955 | Macaulay | |
| 3,491,602 A * | 1/1970 | New | ................... 74/56 |
| 3,986,634 A | 10/1976 | Smith et al. | |
| 4,132,091 A | 1/1979 | Aro et al. | |
| 4,260,169 A | 4/1981 | Hall | |
| 4,299,404 A | 11/1981 | Svoboda | |
| 4,311,074 A | 1/1982 | Titus | |
| 4,362,420 A * | 12/1982 | Van der Veken | ......... 403/343 |
| 4,461,195 A * | 7/1984 | Barnick | ............... 82/158 |
| 4,609,314 A | 9/1986 | Metz | |

(Continued)

FOREIGN PATENT DOCUMENTS

DE    3903766    8/1990

(Continued)

*Primary Examiner*—Boyer Ashley
*Assistant Examiner*—Edward Landrum
(74) *Attorney, Agent, or Firm*—Michael Aronoff; Adan Ayala

(57) ABSTRACT

A blade clamp assembly for retaining a rotary blade on the arbor of a rotary tool includes a blade washer for engaging the blade to hold the blade on the arbor and a clamp assembly threaded into the arbor to clamp the blade washer against the blade. The clamp assembly includes a planetary gear system for transmitting torque applied to the clamp assembly to the blade washer, wherein the planetary gear system multiplies the torque transmitted to the blade washer so that the torque transmitted to the blade washer is greater than the torque applied to the clamp assembly.

3 Claims, 7 Drawing Sheets

U.S. PATENT DOCUMENTS

| | | | |
|---|---|---|---|
| 4,637,170 A | | 1/1987 | Block |
| 4,657,428 A | * | 4/1987 | Wiley ........................ 403/359.3 |
| 4,850,153 A | * | 7/1989 | Husted ........................ 451/342 |
| 4,955,744 A | * | 9/1990 | Barth et al. .................. 403/259 |
| 5,074,703 A | * | 12/1991 | Dawson ........................ 403/342 |
| 5,154,557 A | | 10/1992 | Houck |
| 5,161,334 A | | 11/1992 | Schaal et al. |
| 5,190,423 A | * | 3/1993 | Ewing ........................ 411/134 |
| 5,388,942 A | | 2/1995 | Bonacina et al. |
| 5,518,440 A | | 5/1996 | Bone |
| 5,545,078 A | | 8/1996 | Schulz et al. |
| 5,567,100 A | | 10/1996 | Nakamura |
| 5,577,872 A | | 11/1996 | Nakamura |
| 5,862,727 A | * | 1/1999 | Kelly ........................... 83/13 |
| 5,871,322 A | | 2/1999 | Nakamura |
| 5,947,671 A | | 9/1999 | Kanaan et al. |
| 6,050,741 A | | 4/2000 | Aultman et al. |
| 6,179,512 B1 | | 1/2001 | Gibson et al. |
| 6,261,041 B1 | | 7/2001 | Nakamura |
| 6,467,368 B1 | * | 10/2002 | Feng et al. .................. 74/501.6 |
| 6,584,695 B1 | * | 7/2003 | Chang ........................ 30/391 |
| 6,682,284 B2 | | 1/2004 | Chen |
| 6,729,812 B2 | | 5/2004 | Yaksich et al. |
| 6,755,107 B2 | * | 6/2004 | Peot et al. .................... 83/478 |
| 6,843,627 B2 | | 1/2005 | Childs et al. |
| 6,848,642 B2 | * | 2/2005 | Hitomi ........................ 242/321 |
| 6,913,429 B1 | | 7/2005 | Phillips et al. |
| 6,932,357 B2 | | 8/2005 | Jacobs et al. |
| 7,029,149 B2 | * | 4/2006 | Tung ........................... 362/259 |
| 2004/0043714 A1 | | 3/2004 | Yi ............................... 451/359 |

FOREIGN PATENT DOCUMENTS

| | | |
|---|---|---|
| DE | 19504563 | 8/1996 |
| DE | 20208806 U | 8/2002 |
| DE | 10258372 | 6/2003 |
| DE | 10225051 | 1/2004 |
| DE | 20319324 U | 3/2004 |
| DE | 10308223 | 9/2004 |
| DE | 202004018891 U | 2/2005 |
| EP | 0330672 | 9/1989 |
| EP | 0447408 B1 | 10/1989 |
| EP | 0345271 | 12/1989 |
| EP | 0424388 | 5/1991 |
| EP | 0558277 A1 | 9/1993 |
| EP | 0600854 A1 | 6/1994 |
| EP | 0787262 B1 | 8/1997 |
| EP | 0942802 | 9/1999 |
| EP | 1211027 A2 | 6/2002 |
| WO | WO98/25034 | 6/1998 |

* cited by examiner

BLADE CLAMP ASSEMBLY

CROSS-REFERENCE TO RELATED APPLICATIONS

The present application is a divisional of U.S. patent application Ser. No. 10/687,542, filed Oct. 16, 2003, now U.S. Pat. No. 7,343,841 which is a continuation-in-part of U.S. patent application Ser. No. 10/368,286, now abandoned filed Feb. 18, 2003, which claims benefit under 35 U.S.C. §119(e) of U.S. Provisional Application Ser. Nos. 60/357,377 and 60/357,549 filed Feb. 15, 2002, and claims the benefit under 35 U.S.C. §119(e) of U.S. Provisional Application Ser. No. 60/418,967 filed Oct. 16, 2002. U.S. patent application Ser. No. 10/368,286 and U.S. Provisional Application Ser. Nos. 60/357,377; 60/357,549 and 60/418,967 are herein incorporated by reference in their entirety.

FIELD OF THE INVENTION

The present invention generally relates to the field of rotary power tools employing rotary blades and including, but not limited to, radial arm saws, circular saws, miter saws, and table saws, and more particularly, to a blade clamp assembly for securing a rotary saw blade to the arbor of a rotary power tool without the use of tools.

BACKGROUND OF THE INVENTION

Rotary power tools such as miter saws, circular saws, radial arm saws, table saws, and the like, employ a rotary blade or saw blade comprising a generally circular, planar disk having cutting teeth that is spun by a motor to cut a workpiece. The rotary blade includes a central aperture through which the blade is clamped to the motor output drive shaft or arbor of the rotary power tool.

The process of removing and replacing a rotary blade is difficult and time consuming. Because of the forces placed on the rotary blade during the cutting operation, the blade must be securely clamped to the arbor of the rotary tool. Typically, the arbor of the rotary tool is provided with a flange against which the inner surface of the rotary blade is placed. A second flange is then placed against the outer surface of the rotary blade, and an arbor bolt is threaded into a threaded hole in the arbor through apertures formed in the rotary blade and flanges. The arbor is then held stationary (e.g., by engaging a pin with the motor shaft or using a specially designed tool) and a wrench is used to tighten the arbor bolt within the threaded hole, clamping the rotary blade between the flanges.

Consequently, it has long been desirable to provide a blade clamping assembly that allows rotary blades to be removed and replaced quickly without the use of tools such as wrenches or the like. However, to eliminate the use of tools, any such blade clamping assembly must be capable of multiplying the torque that a user is capable of applying by hand to providing sufficient axial or clamping force to the rotary blade to adequately secure the blade to the arbor.

SUMMARY OF THE INVENTION

Accordingly, the present invention is directed to a blade clamp assembly for retaining a rotary blade on the arbor of a rotary tool. In exemplary embodiments, the blade clamp assembly comprises a blade washer for engaging the blade to hold the blade on the arbor and a clamp assembly threaded into the arbor to clamp the blade washer against the blade. The clamp assembly includes a planetary gear system for transmitting torque applied to the clamp assembly to the blade washer, wherein the planetary gear system multiplies the torque transmitted to the blade washer so that the torque transmitted to the blade washer is greater than the torque applied to the clamp assembly. A lever may be extended from the clamp assembly for increasing the amount of torque applied to the clamp assembly by the user.

It is to be understood that both the foregoing general description and the following detailed description are exemplary and explanatory only and are not necessarily restrictive of the invention as claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

Reference will now be made in detail to the presently preferred embodiments of the invention, examples of which are illustrated in the accompanying drawings.

Figure 1:
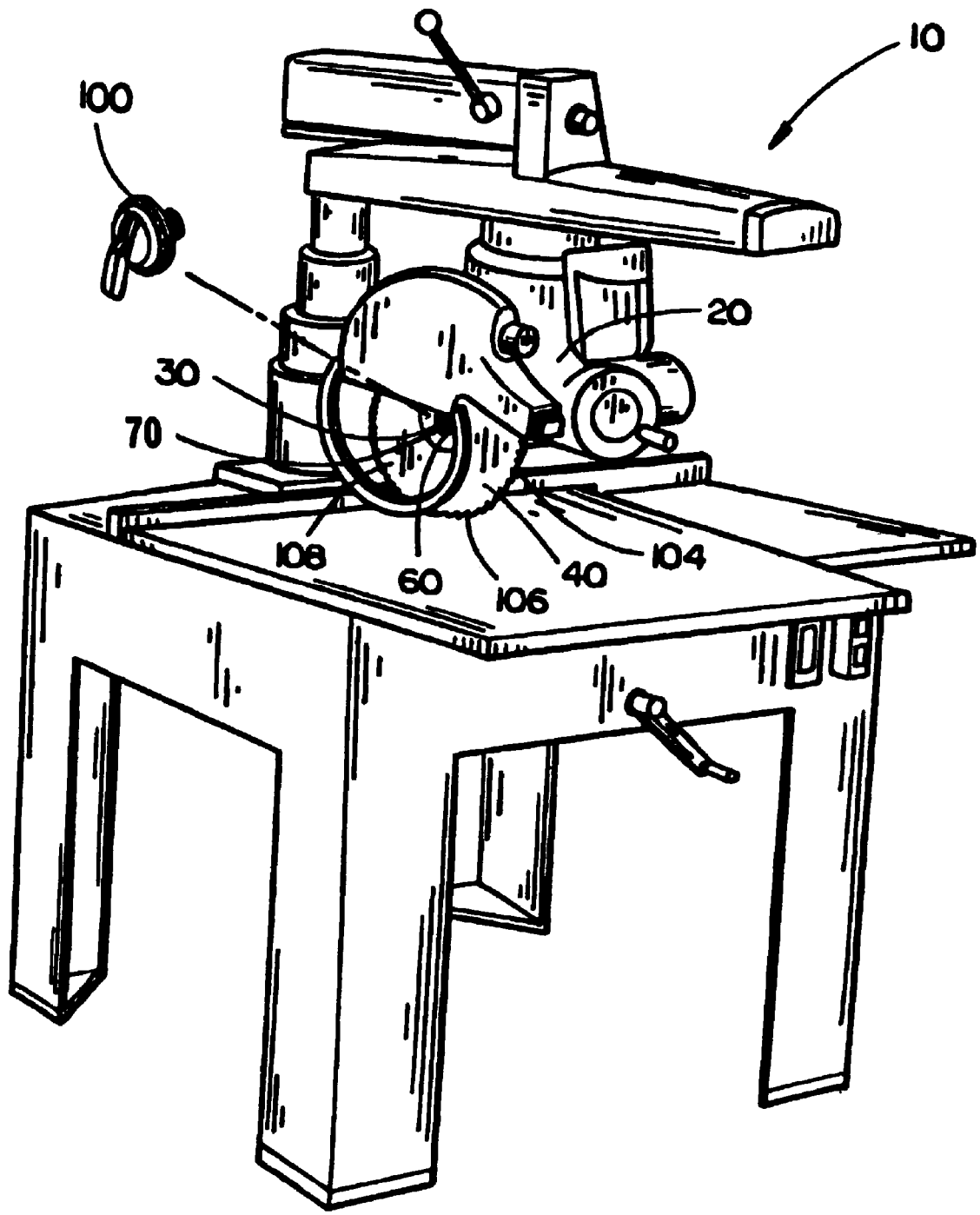
FIG. 1 is an isometric view illustrating an exemplary rotary power tool employing a blade clamp assembly in accordance with the present invention.
Figure 2:
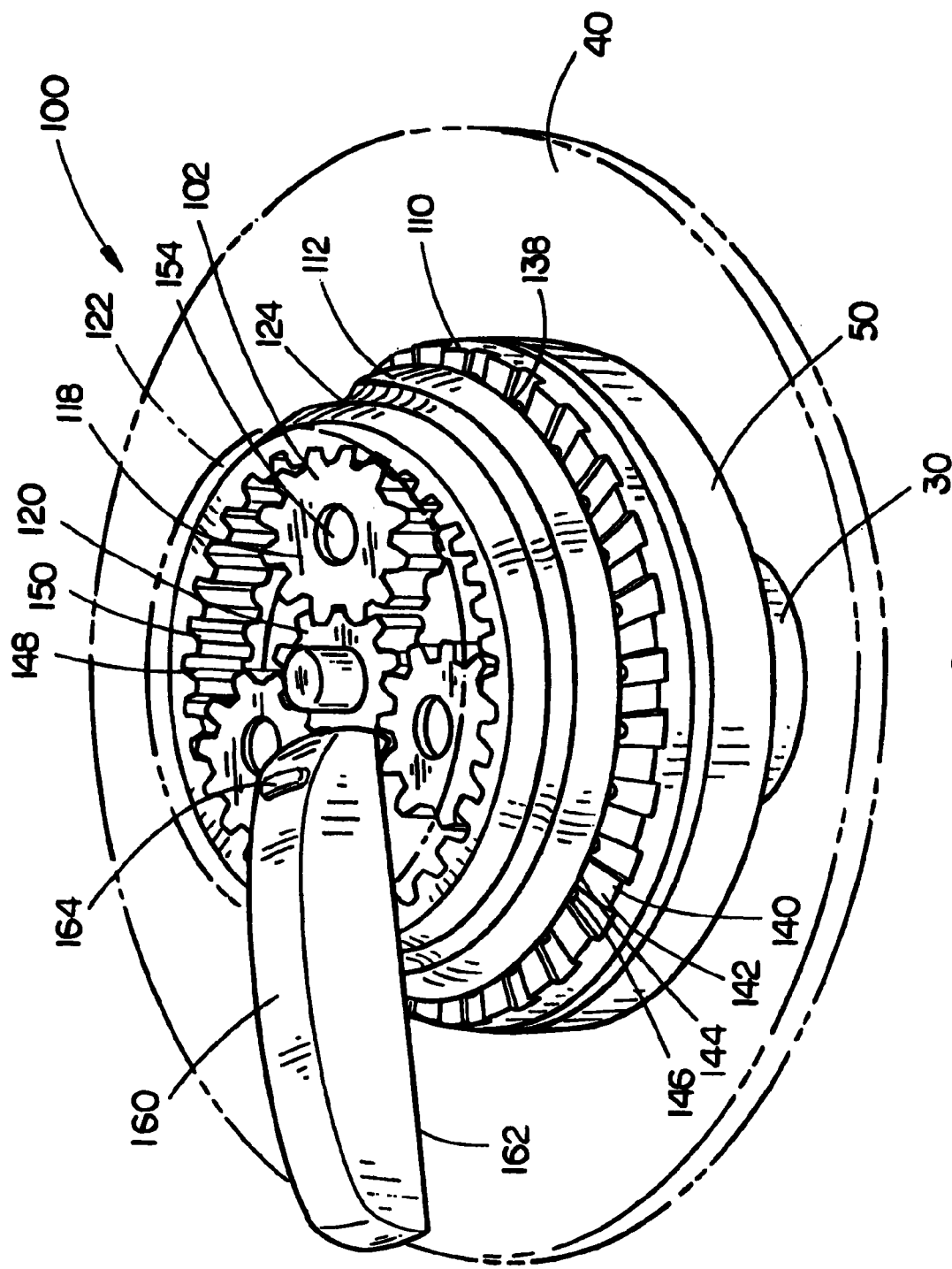
FIG. 2 is an isometric view illustrating a blade clamp assembly in accordance with an exemplary embodiment of the present invention.
Figure 3:
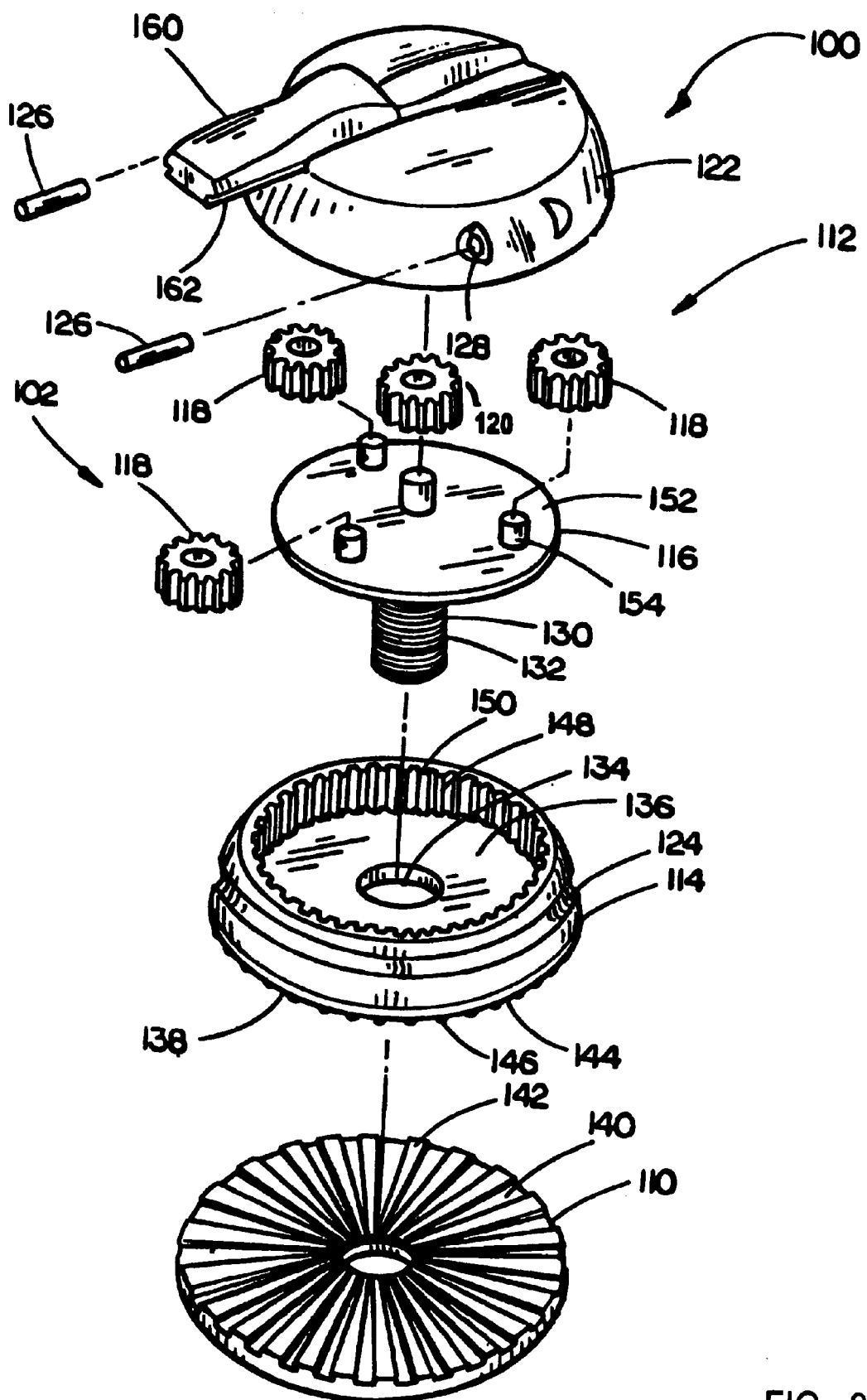
FIG. 3 is an exploded isometric view illustrating components of the blade clamp assembly shown in FIG. 2.
Figure 4:
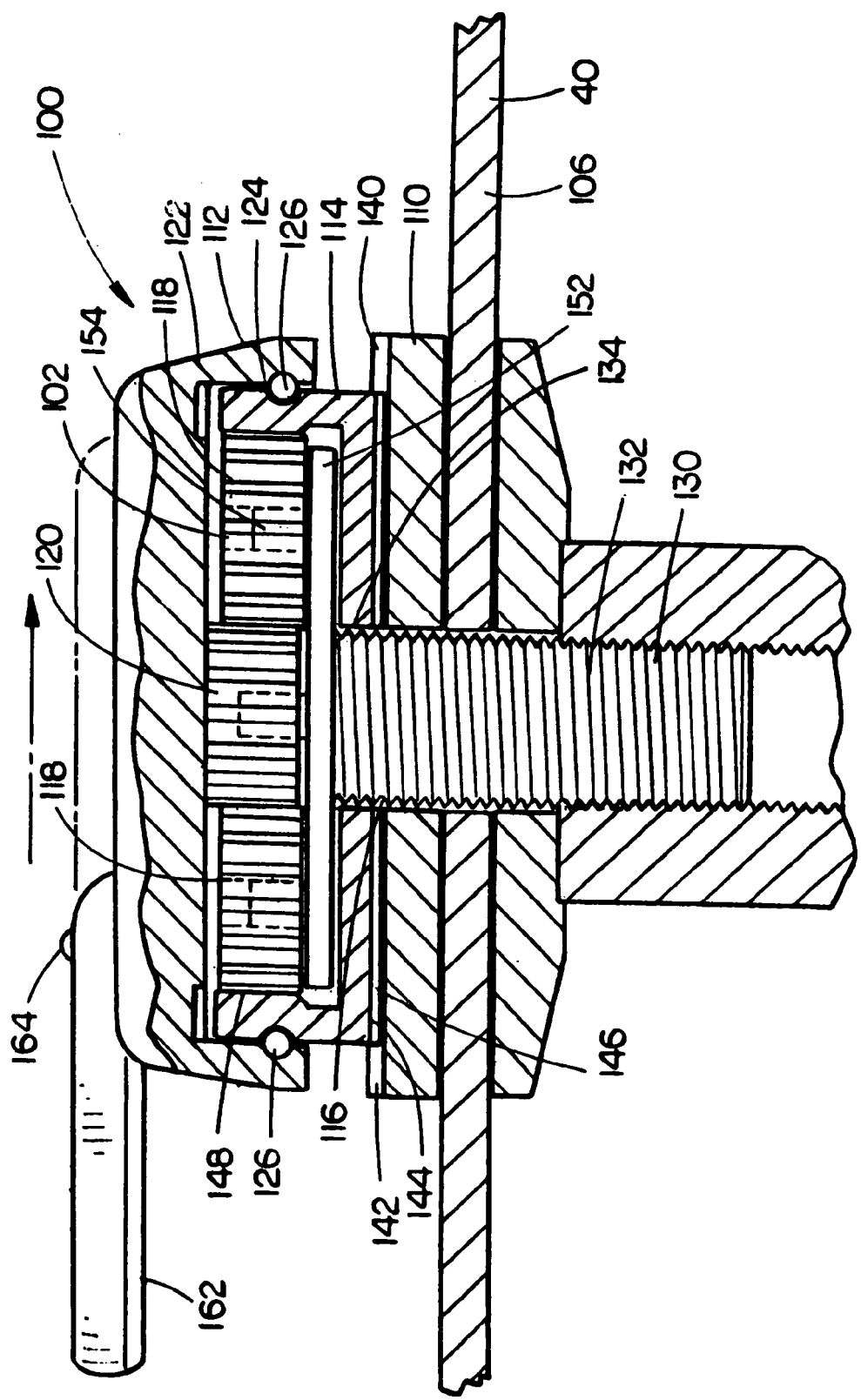
FIG. 4 is a cross-sectional side elevation view of the blade clamp assembly shown in FIG. 2.
Figure 5:
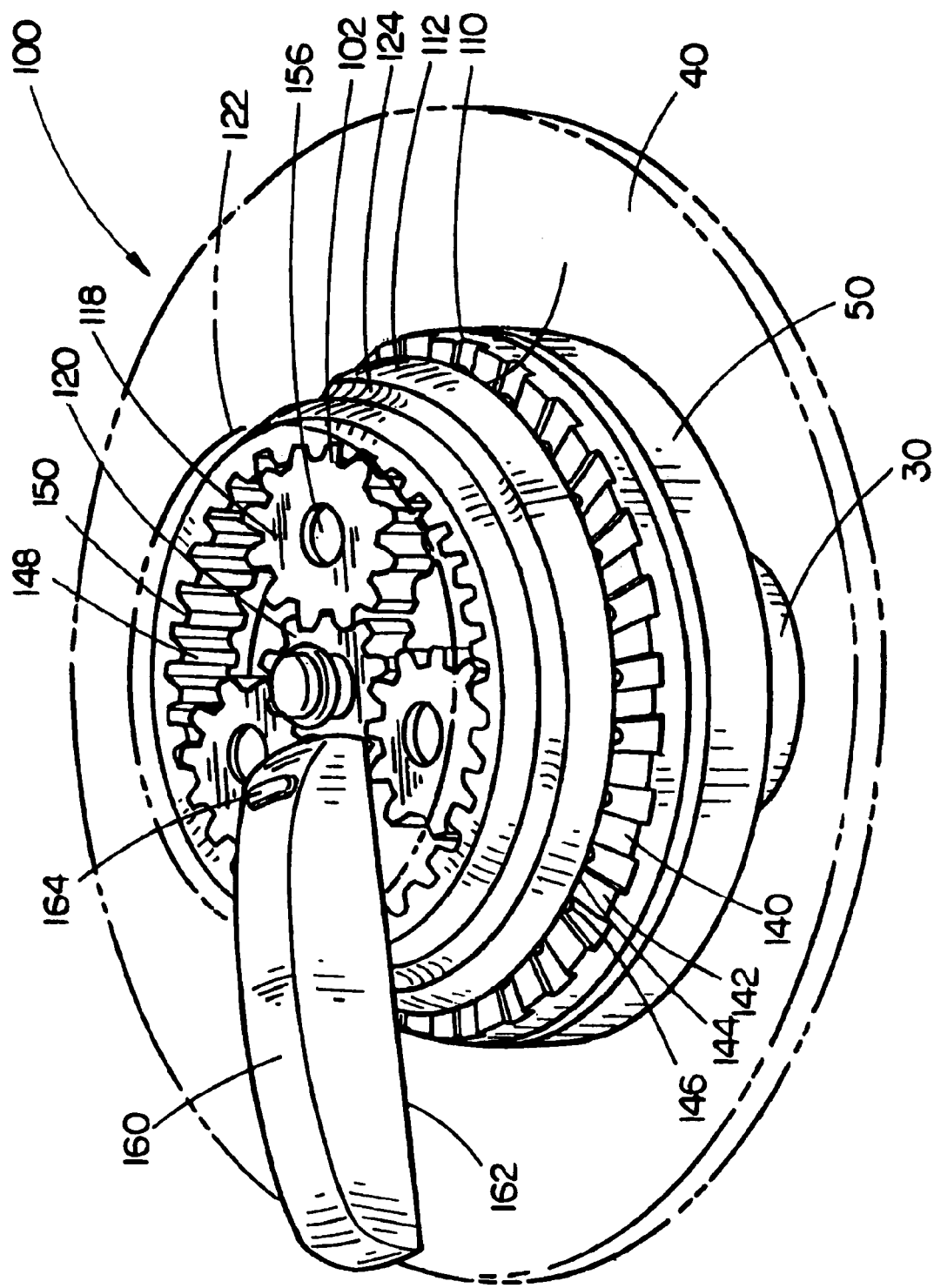
FIG. 5 is an isometric view illustrating a blade clamp assembly in accordance with a second exemplary embodiment of the present invention.
Figure 6:
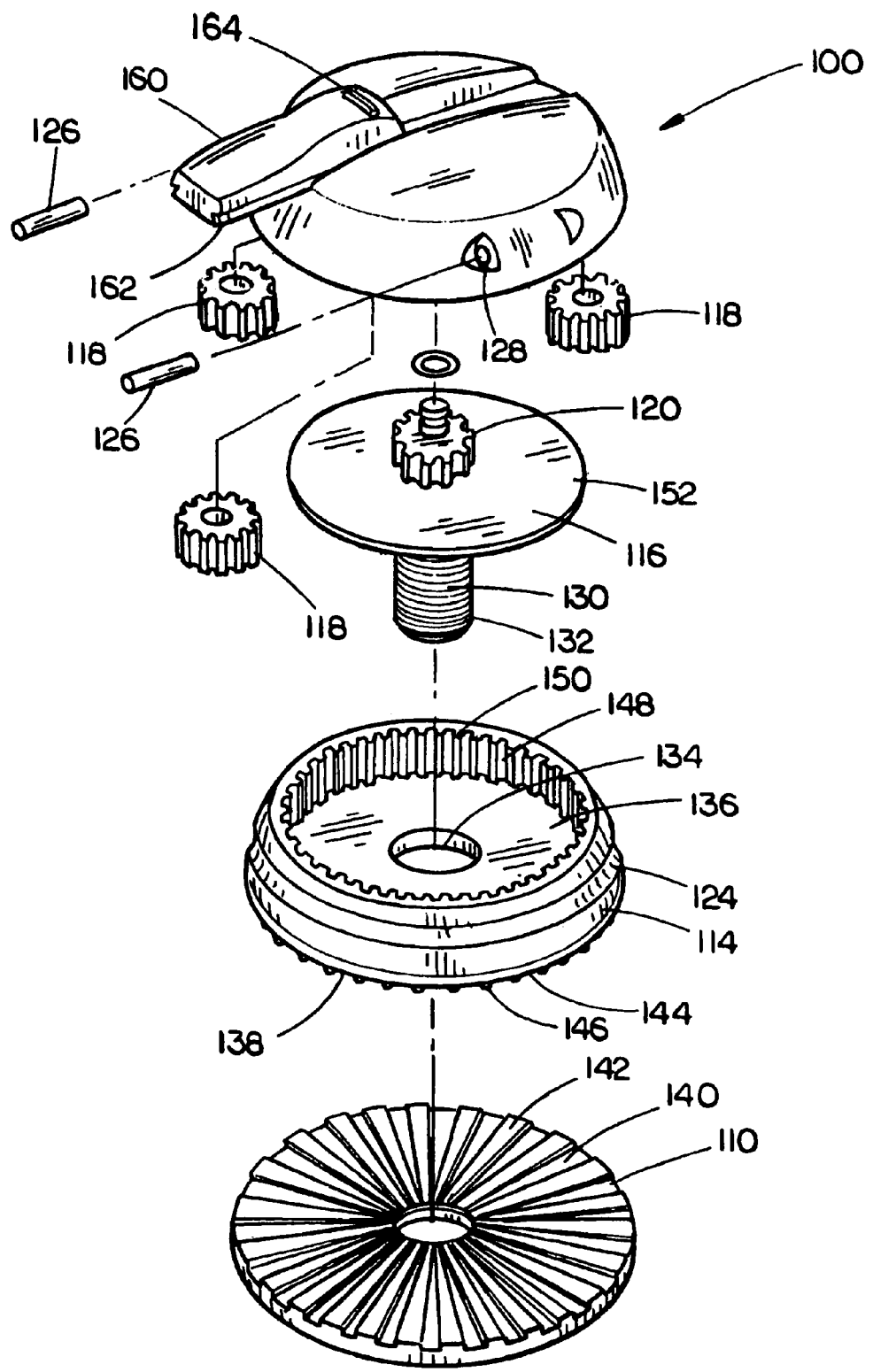
FIG. 6 is an exploded isometric view illustrating components of the blade clamp assembly shown in FIG. 5.
Figure 7:
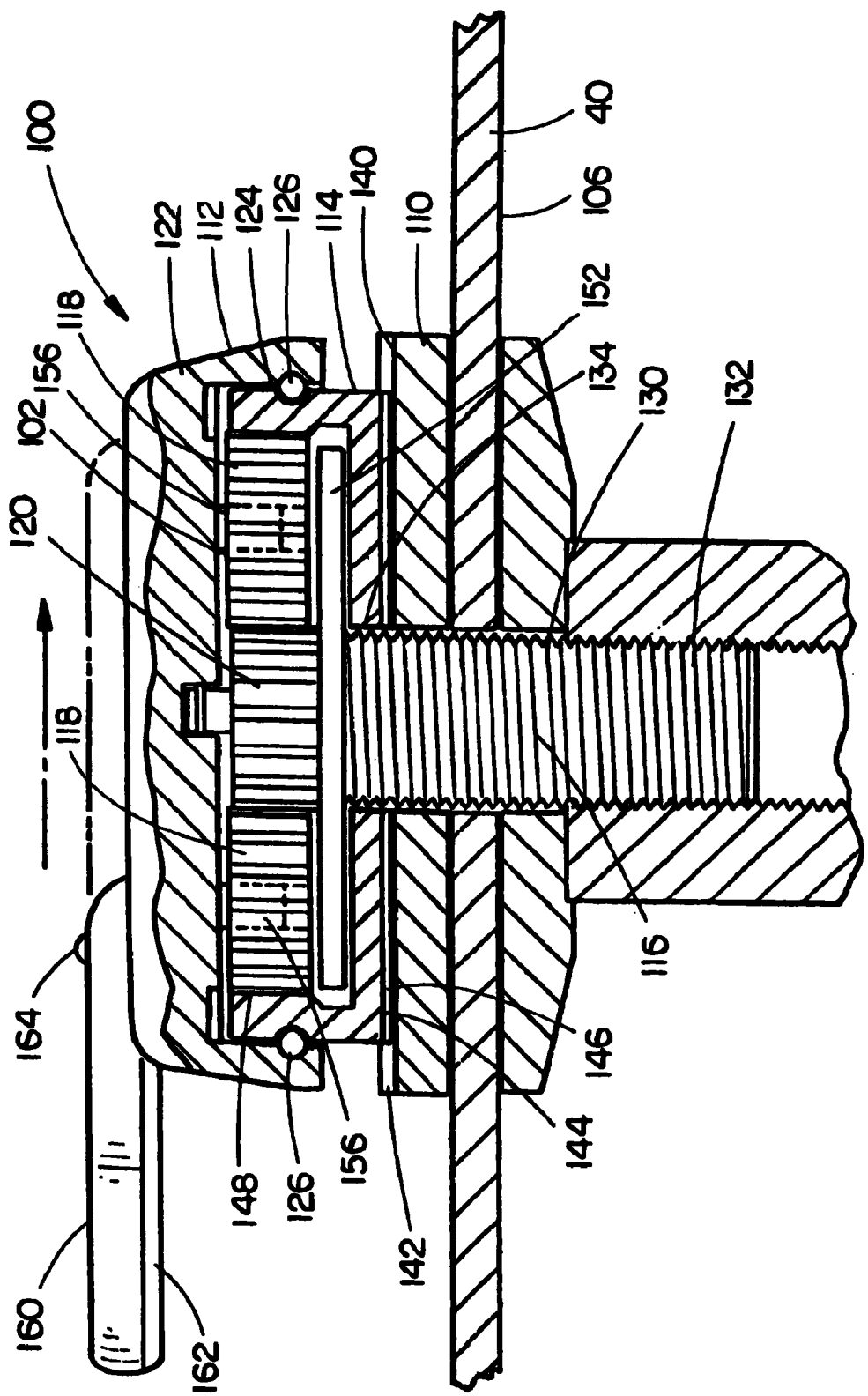
FIG. 7 is a cross-sectional side elevation view of the blade clamp assembly shown in FIG. 2.

Referring to FIG. 1, an exemplary rotary power tool 10 employing a blade clamp assembly 100 in accordance with the present invention is described. The rotary power tool 10, in this case a radial arm saw, includes a motor assembly 20 having an arbor 30 on which a rotary blade 40 (a rotary saw blade is illustrated) may be mounted. The arbor 30 is provided with a flange 50 against which the inner surface 60 of the rotary blade 40 is placed. The arbor is then held stationary (e.g., by engaging a pin with the motor shaft or the like) while the blade clamp assembly 100 is threaded into a threaded hole 70 formed within the arbor 30, clamping the rotary blade 40 against the flange 50. Preferably, the blade clamp assembly 100 multiplies the torque that a user is capable of applying by hand to provide sufficient axial or clamping force to the rotary blade 40 to adequately secure the blade 40 to the arbor 30. The blade clamp assembly 100 thus allows a rotary blade 40 to be affixed to the arbor 30 of a rotary power tool 10, in particular to a rotary cutting tool such as a hand-held circular saw, a miter saw, a table saw, a radial arm saw, or the like, without the use of hand tools such as wrenches, which are typically required by prior art blade clamping assemblies. Preferably, the blade clamp assembly 100 is well balanced and has minimal protruding surfaces.

FIGS. 1 through 7 illustrate blade clamp assemblies 100 in accordance with exemplary embodiments of the present invention. In each embodiment, the blade clamp assembly 100 employs a planetary gear system 102 for multiplying the torque applied to clamp the rotary blade 40 to the arbor 30 of a rotary power tool (e.g., rotary power tool 10 shown in FIG. 1), Preferably, the blade clamp assemblies 100 are suitable for use with rotary blades 40 commonly used in rotary power tools such as miter saws, hand held circular saws, radial arm saws, table saws, and the like, employing circular saw blades. Such circular saw blades typically include a planar disk having cutting teeth for cutting the material of a work piece and a central aperture through which the blade is clamped to the arbor 30 of the rotary power tool 10. In the embodiments illustrated herein in FIG. 1, the rotary blade 40 shown comprises a circular saw blade 104 of the type having a plurality of cutting teeth 106 arranged about a planar disk 108. This saw blade 104 is exemplary of the types of rotary blades 40 that may be used with the blade clamp assembly 100 of the present invention. Thus, the cutting teeth 106 and planar disc 108 shown are also exemplary. Nevertheless, it will be appreciated by those of ordinary skill in the art that the present invention is not limited to use with any particular rotary blade, and that saw blades suitable for use by the present invention may employ a wide variety of cutting teeth and disc designs depending on the shaping operation or cut to be performed by the rotary tool.

In the exemplary embodiments shown in FIGS. 2 through 7, the blade clamp assembly 100 comprises a keyed blade washer 110 for engaging the rotary blade 40 to hold the blade 40 against the flange 50 and a clamp assembly 112 threaded into the threaded hole 60 formed in the arbor 30 for clamping the blade washer 110 against the blade 40. The planetary gear system 102 contained within the clamp assembly 112 transmits torque applied to the clamp assembly 112 to the blade washer 110, multiplying the torque transmitted to the blade washer 110 so that the torque transmitted to the blade washer 110 is greater than the torque applied to the clamp assembly 112 by the user.

The clamp assembly 112 includes a body 114, a bolt assembly 116 retained within the body 114, a planet gear assembly 102 including a plurality of planet gears 118 and a sun gear 120 contained within the body 114 (three planet gears are provided in the embodiments illustrated) and a cap 122. In the embodiments illustrated, the outer surface of the body 114 includes a groove or channel 124 shaped to provide engagement between the body 114 and the cap 122 via pins 126 inserted in apertures 128 in the cap 122 so that the pins 126 slide in the groove 124 and retain the cap 122 to the body 114 while allowing the cap 122 to rotate with respect to the body 114. However, those of ordinary skill in the art will appreciate that the cap 122 may be secured to the body 114 in other ways without departing from the scope and spirit of the present invention. However, the securing method used should not unduly interfere with rotation of the cap 122 on the body, although some interference may be desirable, such as frictional interference or the like, for preventing unwanted movement of the cap 122.

The bolt assembly 116 is seated in the body 114 and includes an arbor bolt 130 having threads 132. The arbor bolt 130 extends through an aperture 134 formed in the bottom 136 of the body 114 for coupling the blade clamp assembly 100 to the arbor 30 of the rotary power tool (e.g., rotary power tool 10 FIG. 1). The planetary gear system 102 transmits torque applied to the cap 122 to the bolt assembly 116 for threading the arbor bolt 130 into the threaded hole 70 formed in the arbor 30, multiplying the torque transmitted to the bolt assembly 116 so that the torque transmitted to the arbor bolt 130 is greater than the torque applied to the cap 122. In exemplary embodiments, the rotary power tool 10 may include a spring loaded locking pin (not shown) that, when depressed by the user, engages a hole formed in the motor output drive shaft or arbor 30 of the rotary power tool 10 to lock the arbor 30 in place. In this manner, the arbor 30 is prevented from spinning as the cap 122 is rotated by the user for tightening or loosening the blade clamp assembly 100, thereby clamping the rotary blade 40 against the flange 50 of the arbor 30 or releasing the rotary blade 40 from the flange 50.

As shown in FIGS. 2 through 7, the outer surface 138 of the bottom 136 of the body 114 is seated against the keyed surface 140 of the blade washer 110. The keyed surface 140 of the blade washer 110 includes a plurality of ridges or keys 142 that are received in corresponding slots 144 between keys 146 formed in the outer surface 138 of the bottom 136 of the body 114 thereby interlocking the blade washer 110 and the body 114 as the blade clamp assembly 100 is tightened against the rotary blade 40. In this manner, seating of the keyed blade washer 110 against the rotary blade 40 secures the body 114 through the interaction of the keys 142 formed in the keyed blade washer 110 with the slots 144 formed in the body 114.

In the embodiments illustrated, the planetary gear system 102 further includes a ring gear 148 formed on the inner side surface 150 of the body 114. The planet gears 118 of the planet gear assembly 102 orbit about the sun gear 120 within the ring gear 148. In one embodiment, shown in FIGS. 2, 3 and 4, the bolt assembly 116 comprises a carrier 152 which includes a plurality of circumferentially spaced pins 154 (three pins 154 are illustrated) on which the planet gears 118 rotate, while the sun gear 120 is fixedly attached to the cap 122. As the cap 122 is rotated by the user, the sun gear 120 rotates, turning the planet gears 118 and rotating the carrier 152, which in turn rotates the arbor bolt 130 for threading the arbor bolt 130 into the arbor 30. In the second embodiment shown in FIGS. 5, 6 and 7, the cap 122 functions as the carrier for the planet gears 118 and includes circumferentially spaced pins 156 on which the planetary gears 118 rotate. In this configuration, the sun gear 120 is fixedly attached to the carrier 152 which is in turn fixedly attached to the arbor bolt 130. As the cap 122 is rotated by the user, the planet gears 118 are rotated turning the sun gear 120 and rotating the carrier 152, which in turn rotates the arbor bolt 130 for threading the arbor bolt 130 into the threaded hole 60 of the arbor 30.

In both embodiments, the gear teeth of the planet gears 118 are enmeshed between the gear teeth of the sun gear 120 and the gear teeth of the body ring gear 148. Preferably, the planet gears 118 are rotationally connected to the pins 154 or 156 so that the planet gears 118 rotate while orbiting between the sun gear 120 and the body ring gear 148 when the cap 122 is rotated by the user. The planet gears 118 rotate and orbit, causing the bolt assembly 116 to rotate in the same direction as the cap 122, though at a slower rate. In this manner, the arbor bolt 130, which is threaded to the arbor 30, rotates when the cap 122 is rotated, compressing the rotary blade 40 between the keyed blade washer 110 and the arbor flange 50 thereby securing the blade 40 to the arbor 30. Alternately, when the cap 122 is rotated in the opposing direction, the bolt assembly 116 also rotates in the opposing direction, loosening the arbor bolt 130 from the arbor and unclamping the rotary blade 40 so that the blade 40 may be released from the arbor 30.

Preferably, the size and pitch of the gear teeth of the planet gears 118, the sun gear 120 and the ring gear 148 are selected along with the respective diameters of the cap 122, the planet gears 118 and the body ring gear 148 to provide the desired torque multiplication. However, it will be appreciated by those of skill in the art that the present invention need not be limited to the configuration specifically disclosed herein. For example, it is contemplated that additional layers of planet gears may be provided without departing from the scope and spirit of the present invention.

The planetary design of the present invention is capable of providing a large torque advantage compared to a conventional hand-tightened arbor bolt since the torque applied to the arbor bolt 130 by hand-tightening the cap 122 may be multiplied many times over that which is typically applied by a user's hand. Those of ordinary skill in the art will appreciate that the torque magnification factor of the present invention will depend upon the size of the parts, pitch diameters chosen for the parts, and the like. In the case of a conventional rotary power tool, such as rotary power tool 10, or the like, for example, parts may be chosen for enabling a person of ordinary physical strength to hand-tighten the blade clamp assembly 100 sufficiently to provide adequate axial force for retaining the saw blade 40 against the flange 50 of the arbor 30. This may be desirable because the human hand is not typically capable of applying the needed torque for sufficiently tightening a conventional hex-head-type blade clamp assembly without the use of hand tools, such as wrenches, or the like, to provide the necessary additional mechanical advantage.

In embodiments of the present invention, the cap 122 further includes an extensible lever 160 for providing additional mechanical advantage for tightening the blade clamp assembly 100 onto the arbor 30. In the embodiment illustrated in FIGS. 1 through 7, the extensible lever 160 is slidably received in the cap 122 via a groove and rail assembly 162 and includes a raised portion 164 suitable for being pushed by a user to extend the extensible lever 160 outward from the cap 122. In this manner, the lever may be used to provide additional mechanical advantage for tightening and loosening the blade clamp assembly 100 while still providing a balanced assembly clamping the rotary blade 40 against the arbor 30 as the blade 40 is spun. Although an extensible lever 160 is described in the exemplary embodiments illustrated herein, those of ordinary skill in the art will appreciate that many other configurations for aiding in the rotation of the cap 122 may be provided without departing from the scope and intent of the present invention. For example, extensible levers 160 may be provided that pivot away from the cap 122, or rotate outward from the cap 122, or notches or ridges may be placed about the exterior of the cap 122 for providing friction against a tightening or loosening force applied by the fingers of an operator.

In accordance with an exemplary embodiment of the present invention, to install a rotary blade 40 onto the arbor 30 of the rotary power tool 10, the rotary blade 40 is first placed on the arbor 30 against the arbor flange 50. The keyed blade washer 110 is then placed on the arbor 30 against the rotary blade 40 with ridges or keys 142 facing outward away from the blade 40. The arbor bolt 130 of the clamp assembly 112 is next threaded into the threaded hole 60 of the arbor 30 and the clamp assembly 112 is spun on until the arbor bolt 130 is hand tight. As the spinning body 114 of the clamp assembly 112 advances against the keyed blade washer 110 and the keys 142 and 146 of the washer 110 and the body 114 mesh, the body 114 of the clamp assembly 112 stops rotating. The spindle lock (not shown) of the rotary power tool is then engaged to prevent rotation of the arbor 30. Next, the extensible lever 160 is manually extended and used to rotate the cap 122, driving the cap 122 about the center axis of the arbor bolt 130. The planetary gear system 102 multiplies the torque applied to the lever 160, causing the thread of the arbor bolt 130 to advance into the threaded hole 60 formed in the arbor 30 and forcing the body 114 against the keyed blade washer 110 which is in turn forced against the rotary blade 40 clamping the blade 40 between the washer 110 and the flange 50 of the arbor 30. After the blade clamp assembly 100 is tightened, the extensible lever 160 is slid back into the cap 122. Removal of the blade clamp assembly 100 for replacing the rotary blade 40 is accomplished by reversing this process.

It is believed that the present invention and many of its attendant advantages will be understood by the foregoing description, and it will be apparent that various changes may be made in the form, construction and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. A blade clamp assembly for retaining a rotary blade on an arbor of a rotary tool, comprising:
   a blade washer for engaging the blade to hold the blade on the arbor; and
   a clamp assembly for being threaded into the arbor to clamp the blade washer against the blade, the clamp assembly including a body and a planetary gear system for transmitting torque applied to the clamp assembly to the blade washer, the planetary gear system including a sun gear and a planet gear,
   a bolt assembly retained within the body, the bolt assembly including a carrier and a threaded bolt attached to an arbor-side of the carrier and extending through the body for coupling the clamp assembly to the arbor;
   a cap coupled to the body, the sun gear attached to the cap and engaging the planet gear,
   wherein, upon the cap being turned, the sun gear rotates the planet gear for turning the bolt assembly,
   wherein the body includes a keyed bottom surface and the blade washer comprises a keyed upper surface for engaging the keyed bottom surface of the body, and
   wherein the planetary gear system multiplies the torque transmitted to the blade washer so that the torque transmitted to the blade washer is greater than the torque applied to the clamp assembly.

2. The blade clamp assembly as claimed in claim 1, wherein the body comprises a ring gear that engages the planet gear.

3. The blade clamp as claimed in claim 1, further comprising a lever extending from the cap for increasing the amount of torque applied to the cap.

* * * * *